(12) United States Patent
Chen

(10) Patent No.: US 6,364,423 B1
(45) Date of Patent: Apr. 2, 2002

(54) RETAINING DEVICE ADAPTED TO RETAIN TENSELY SPOKES BETWEEN A WHEEL RIM AND A HUB OF A BICYCLE WHEEL

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/676,156

(22) Filed: Sep. 29, 2000

(51) Int. Cl.[7] ................................................ B60B 1/04
(52) U.S. Cl. ........................................ 301/59; 301/104
(58) Field of Search ............................ 301/104, 105.1, 301/106, 110.5, 124.2, 55, 59, 60; 27/894.33, 894.333

(56) References Cited

U.S. PATENT DOCUMENTS

| | | | | |
|---|---|---|---|---|
| 4,099,788 A | * | 7/1978 | Trunnell | 301/105.1 |
| 5,429,421 A | * | 7/1995 | Watson | 301/59 |
| 5,494,337 A | * | 2/1996 | Behnke | 301/59 |
| 5,626,401 A | * | 5/1997 | Tery, Sr. et al. | 301/59 |
| 5,810,453 A | * | 9/1998 | O'Brien | 301/59 |
| 5,882,088 A | * | 3/1999 | Yahata | 301/59 |
| 6,010,197 A | * | 1/2000 | Crosnier et al. | 301/110.5 |
| 6,036,279 A | * | 3/2000 | Campagnolo | 301/58 |
| 6,068,347 A | * | 5/2000 | Okajima et al. | 301/58 |
| 6,068,348 A | * | 5/2000 | Okajima et al. | 301/58 |
| 6,158,819 A | * | 12/2000 | Okajima et al. | 301/104 |

* cited by examiner

Primary Examiner—S. Joseph Morano
Assistant Examiner—Long Bao Nguyen
(74) Attorney, Agent, or Firm—Townsend and Townsend and Crew LLP

(57) ABSTRACT

A retaining device includes a pair of annular retaining members and a pair of securing members. Each annular retaining member is adapted to be interposed between an axle and enlarged head portions of spoke tightening members in an annular space defined between the axle and an annular inner peripheral wall of a tubular mount member. The annular retaining member includes an annular inner ring portion sleeved on the axle, an annular outer ring portion surrounding and rotatable relative to the annular inner ring portion, and a rolling element disposed between the annular inner and outer ring portions. Each securing member is disposed on the axle such that the annular outer ring portion faces towards the enlarged head portions so as to guard shoulders of the spoke tightening members against being loosened from abutment with the inner peripheral wall.

6 Claims, 3 Drawing Sheets

RETAINING DEVICE ADAPTED TO RETAIN TENSELY SPOKES BETWEEN A WHEEL RIM AND A HUB OF A BICYCLE WHEEL

BACKGROUND OF THE INVENTION

1. Field of the Invention

This invention relates to a bicycle wheel, more particularly to a retaining device adapted to retain tensely spokes between a wheel rim and a hub of the bicycle wheel.

2. Description of the Related Art

A conventional bicycle wheel includes an axle with two axle ends to be carried by two prongs of a bicycle fork, a wheel rim, a hub rotatably mounted on the axle between the axle ends, and a plurality of spokes connecting the hub to the wheel rim. Each spoke is connected to a respective engaging groove in the hub by a spoke tightening member. The tightening member includes a stem portion in which the spoke is secured threadedly, and an enlarged head portion which abuts against an annular inner wall of the hub so as to tighten tensely the spoke between the wheel rim and the hub. However, the spoke tightening member tends to be loosened to move toward the axle after a long term use and thus loosens the spoke, thereby resulting in uneven tension among the spokes and deforming of the wheel rim.

SUMMARY OF THE INVENTION

The object of the present invention is to provide a retaining device which guards spoke tightening members that engages a tubular mount member of a hub against movement toward an axle so as to ensure tension of spokes between a wheel rim and the hub.

According to this invention, the retaining device includes a pair of annular retaining members and a pair of securing members. Each annular retaining member is adapted to be interposed between an axle and enlarged head portions of spoke tightening members in an annular space defined between the axle and an annular inner peripheral wall of a tubular mount member. The annular retaining member includes an annular inner ring portion which is adapted to be sleeved on the axle from an axle end to the tubular mount member, an annular outer ring portion which surrounds and which is rotatable relative to the annular inner ring portion, and a rolling element which is disposed between the annular inner and outer ring portions. Each securing member is disposed to secure the annular inner ring portion on the axle such that the annular outer ring portion is adapted to face towards the enlarged head portions of the spoke tightening members so as to guard shoulders of the spoke tightening members against being loosened from abutment with the inner peripheral wall.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
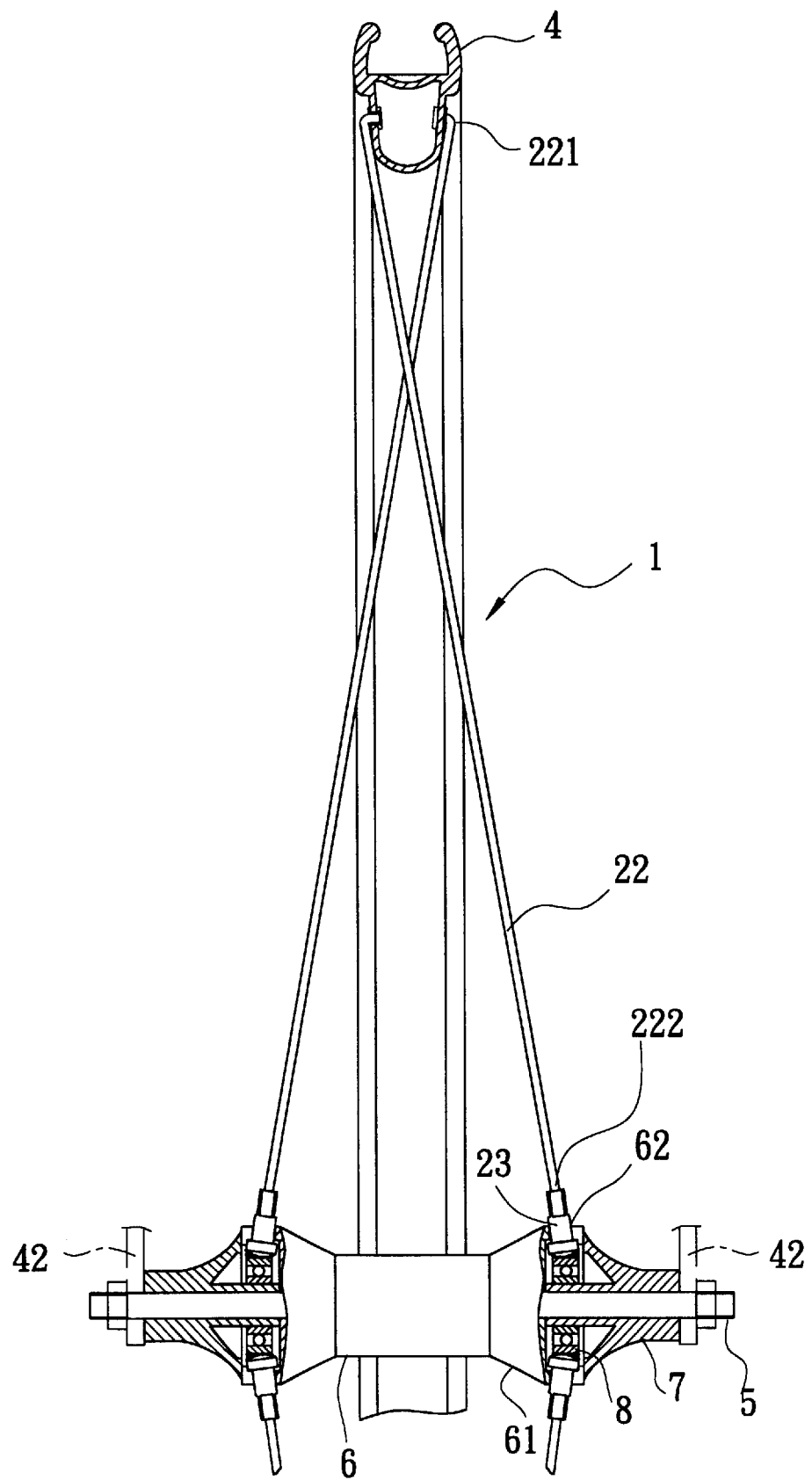
FIG. 1 is a schematic view of a preferred embodiment of a retaining device according to this invention when mounted on a bicycle wheel.
Figure 2:
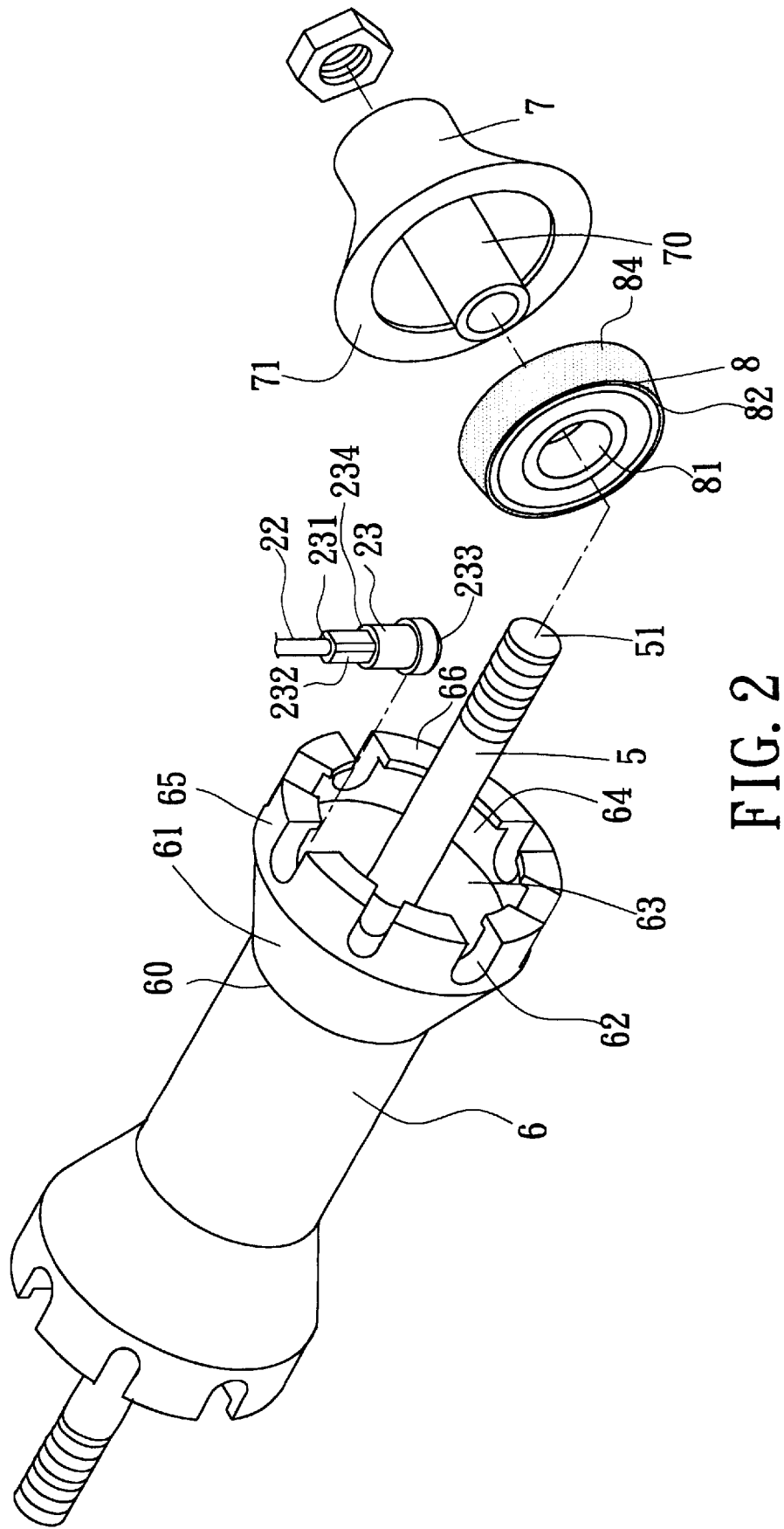
FIG. 2 is an exploded perspective view of the retaining device and a hub of the bicycle wheel.
Figure 3:
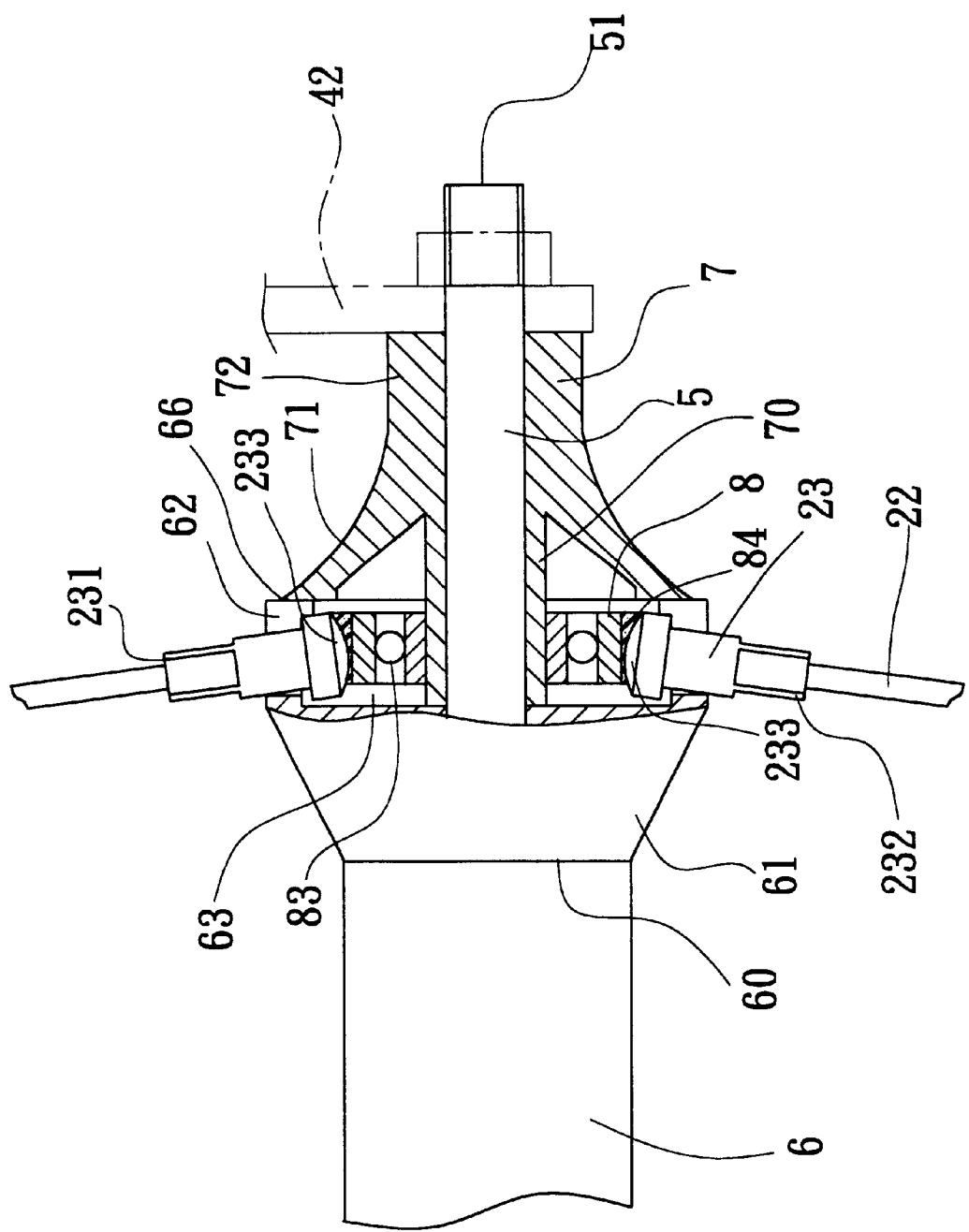
FIG. 3 is a partly sectional schematic view of the retaining device when mounted in the hub.

Referring to the drawings, the preferred embodiment of the retaining device according to the present invention is shown to be mounted on an axle 5 of a bicycle wheel 1. The bicycle wheel 1 includes the axle 5 which extends in an axial direction and which has two axle ends 51 to be carried by two prongs 42 of a bicycle fork, and a wheel body. The wheel body includes a wheel rim 4, and a hub body 6 which is rotatably mounted on the axle 5 between the axle ends 51, and which includes two ends 60 that are disposed opposite to each other in the axial direction. Two tubular mount members 61 are disposed on and extend from the ends 60 of the hub body 6 in the axial direction, respectively. Each tubular mount member 61 has an inner peripheral wall 64 which surrounds and which is radially spaced apart from the axle 5 to form an annular space 63 therebetween, an outer peripheral wall 65 which is disposed radially opposite to the inner peripheral wall 64, an annular edge wall 66 which extends radial to the axial direction and which joins the inner peripheral wall 64 with the outer peripheral wall 65, and a plurality of engaging grooves 62 which are arranged to be angularly spaced apart from one another. Each engaging groove 62 extends from the annular edge wall 66 in the axial direction, and extends radially from the outer peripheral wall 65 to communicate with the inner peripheral wall 64.

A plurality of spokes 22 connect the hub body 6 to the wheel rim 4. Each spoke 22 has a hook end 221 which is hooked on the wheel rim 4, and an engaging end 222 which engages a respective one of the tubular mount members 61 via a spoke tightening member 23. The spoke tightening member 23 includes a stem portion 232 which has an internal thread 231 secured to the engaging end 222 of the respective spoke 22 and which is of a dimension sufficient to be received in the respective engaging groove 62 in the axial direction, and an enlarged head portion 233 which extends from the stem portion 232 to form a shoulder 234 therebetween to abut against the inner peripheral wall 64 when the stem portion 232 is inserted into the respective engaging groove 62 and is tightened to tension the respective spoke 22 between the wheel rim 4 and the hub body 6.

The retaining device of the preferred embodiment includes a pair of annular retaining members 8 and a pair of securing members 7. Each annular retaining member 8, such as a bearing assembly, is interposed between the axle 5 and the enlarged head portions 233 of the spoke tightening members 23 in the annular space 63, and includes an annular inner ring portion 81 which is sleeved on the axle 5 from the axle end 51 to the respective tubular mount member 61, an annular outer ring portion 82 which surrounds and which is rotatable relative to the annular inner ring portion 81 and which faces towards the enlarged head portions 233 radial to the axial direction, and a rolling element 83 which is disposed between the annular inner and outer ring portions 81,82. Preferably, an annular friction layer 84 is disposed on the annular outer ring portion 82 and is made of rubber material to provide a friction contact with the enlarged head portions 233 of the spoke tightening members 23. More preferably, the annular friction layer 84 has proximate and distal ends relative to the annular edge wall 66 and opposite to each other in the axial direction, and converges gradually from the proximate end to the distal end so as to abut tightly against the enlarged head portions 233. Therefore, the spoke tightening members 23 can be prevented from being loosened toward the axle 5 so as to guard the shoulders 234 against being loosened from abutment with the inner peripheral wall 64.

Each securing member 7 includes an annular insert portion 70 which is sleeved on and which is in friction contact with the axle 5 to provide an annular friction contact surface for the annular inner ring portion 81 of the retaining member 8 so as to immobilize the annular inner ring portion 81 relative to the axle 5 in the axial direction, an annular abutment portion 72 which is formed integrally with and which extends from the insert portion 70 in the axial direction away from the respective retaining member 8 and which abuts against the prong 42 of the bicycle fork, and a skirt portion 71 which flares from the abutment portion 72 towards the insert portion 70 so as to face and shield the annular edge wall 66, thereby providing protection against dust.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A retaining device for a bicycle wheel which includes an axle extending in an axial direction and having two axle ends to be carried by two prongs of a bicycle fork, and a wheel body including a wheel rim, a hub body rotatably mounted on the axle between the axle ends, and including two ends disposed opposite to each other in the axial direction, two tubular mount members respectively disposed on and extending from the ends of the hub body in the axial direction, each of the tubular mount members having an inner peripheral wall surrounding and radially spaced apart from the axle to form an annular space therebetween, an outer peripheral wall disposed radially opposite to the inner peripheral wall, an annular edge wall extending radial to the axial direction and joining the inner peripheral wall with the outer peripheral wall, and a plurality of engaging grooves arranged to be angularly spaced apart from one another, each of the engaging grooves extending from the annular edge wall in the axial direction, and extending radially from the outer peripheral wall to communicate with the inner peripheral wall, a plurality of spokes connecting the hub body to the wheel rim, each of the spokes having an engaging end, and a plurality of spoke tightening members, each including a stem portion secured to the engaging end of a respective one of the spokes and of a dimension sufficient to be received in a respective one of the engaging grooves in the axial direction, and an enlarged head portion extending from the stem portion to form a shoulder therebetween to abut against the inner peripheral wall when the stem portion is inserted into the respective one of the engaging grooves and is tightened to tension the respective one of the spokes between the wheel rim and the hub body, said retaining device comprising:

a pair of annular retaining members, each adapted to be interposed between the axle and the enlarged head portions of the spoke tightening members in the annular space, and each including an annular inner ring portion adapted to be sleeved on the axle from the axle end of the axle to a respective one of the tubular mount members, an annular outer ring portion surrounding and rotatable relative to said annular inner ring portion, and a rolling element disposed between said annular inner and outer ring portions; and a pair of securing members, each disposed to secure said annular inner ring portion on the axle such that said annular outer ring portion is adapted to face towards the enlarged head portions of the spoke tightening members radial to the axial direction so as to guard the shoulders against being loosened from abutment with the inner peripheral wall.

2. The retaining device as claimed in claim 1, wherein said annular outer ring portion of each of said annular retaining members has proximate and distal ends disposed opposite to each other in the axial direction and in relation to the annular edge wall, said proximate end being of a diameter larger than that of said distal end so as to be brought to abut tightly against the enlarged head portions when said annular inner ring portion is sleeved on the axle from the axle end.

3. The retaining device as claimed in claim 2, wherein said annular outer ring portion converges gradually from said proximate end to said distal end.

4. The retaining device as claimed in claim 1, wherein each of said retaining members further includes an annular friction layer made of rubber material and disposed on said annular outer ring portion to provide a friction contact with the enlarged head portions.

5. The retaining device as claimed in claim 1, wherein each of said securing members includes an annular insert portion adapted to be sleeved on and in friction contact with the axle to provide an annular friction contact surface for said annular inner ring portion so as to immobilize said annular inner ring portion relative to the axle in the axial direction.

6. The retaining device as claimed in claim 5, wherein each of said securing members further includes an annular abutment portion integrally formed with and extending from said insert portion in the axial direction away from a respective one of said retaining members and adapted to abut against the prong of the bicycle fork, and a skirt portion flaring from said abutment portion towards said insert portion so as to face and shield the annular edge wall.

* * * * *